(12) United States Patent
Weibel

(10) Patent No.: US 7,655,165 B2
(45) Date of Patent: Feb. 2, 2010

(54) METHOD OF PRODUCING EDIBLE CELLULOSIC FILMS

(76) Inventor: Michael K. Weibel, 120 Gallows Hill Rd., Redding, CT (US) 06896

( * ) Notice: Subject to any disclaimer, the term of this patent is extended or adjusted under 35 U.S.C. 154(b) by 761 days.

(21) Appl. No.: 11/049,042

(22) Filed: Feb. 2, 2005

(65) Prior Publication Data

US 2005/0129814 A1    Jun. 16, 2005

Related U.S. Application Data

(62) Division of application No. 09/819,465, filed on Mar. 28, 2001, now Pat. No. 6,936,291.

(60) Provisional application No. 60/192,666, filed on Mar. 28, 2000.

(51) Int. Cl.
*B29D 7/00* (2006.01)

(52) U.S. Cl. ................. 264/212; 264/213; 264/175; 426/515; 426/517

(58) Field of Classification Search ............ 34/113; 425/223, 115, 365, 89; 264/213, 175, 212; 242/542; 159/11.1; 426/665, 512, 515, 517
See application file for complete search history.

(56) References Cited

U.S. PATENT DOCUMENTS

| 3,101,722 | A | * | 8/1963 | Merritt et al. | ......... | 131/304 |
| 5,487,419 | A | * | 1/1996 | Weibel | ......... | 162/9 |
| 5,747,648 | A | * | 5/1998 | Bassi et al. | ......... | 530/374 |
| 5,817,381 | A | * | 10/1998 | Chen et al. | ......... | 428/34.8 |

* cited by examiner

*Primary Examiner*—Christina Johnson
*Assistant Examiner*—Galen Hauth
(74) *Attorney, Agent, or Firm*—Patrick J. Hagan; Dann, Dorfman, Herrell and Skillman, P.C.

(57) ABSTRACT

Disclosed is a process for continuous casting of edible cellulose-containing film sheets having unique physical characteristics. The cellulose film sheets have diverse applications in the processed food industry.

8 Claims, 1 Drawing Sheet

METHOD OF PRODUCING EDIBLE CELLULOSIC FILMS

CROSS-REFERENCE TO RELATED APPLICATIONS

This application is a divisional of U.S. application Ser. No. 09/819,465, filed Mar. 28, 2001, now U.S. Pat. No. 6,936,291, which claims the benefit of U.S. Provisional Application No. 60/192,666, filed Mar. 28, 2000.

BACKGROUND OF THE INVENTION

Cellulose-based films have an extensive history and technology. A common characteristic is that such films are produced by chemical, mechanical or combinations of chemical and mechanical processing of structural plant matter to provide a sheet-like matrix. This matrix contains dispersed or partially disintegrated cell walls and may contain numerous additives to improve processing or end-use function. The most prevalent commercial form is paper and paper related constructs such as cardboard or corrugated cardboard. Other specialized products are well known in the art such as tissue and glassine papers representing the extremes of mechanical processing. Tissues are low bulk density web like entanglements of dispersed plant fibers with low additive content, whereas glassine is a high density fragmented fiber product with substantial additive content. Many modifications of the above constituting commercial forms selected for specific function are known in the art of paper and paper related products.

Paper products and paper related constructs have been traditionally manufactured from rolled sheet stock. In the paper making process, a dispersed structural plant cell suspension is deposited on a mobile belt or static filtering interface such as a woven screen to provide a fiber entangled mat which is dewatered by mechanical or vacuum assisted expression and subsequent thermal assisted evaporation to provide a continuous or discrete sheet. These products are deliberately calendered or compressed to further enhance physical entanglement. This results in a higher tear modulus, better wet strength and hence less dispersibility, and smooth surfaces for high density roll production. While these properties are desirable for purposes such as packaging applications, they are diametrically opposed to those desired for the application intended in accordance with this invention. That is to say, conventional paper and paper related products are not considered as desired components of comestibles and have low organoleptic acceptance.

Fine paper products such as glassines and tobacco wrapper products, in contrast to packaging forms of cellulosic films, are produced by evaporative processing only. Typically a dispersed cellulosic phase is cast on a horizontal nonfiltering surface such as a belt and evaporative removal of the volatile continuous phase is effected as the belt moves into an elevated thermal environment. The resulting film is removed from the mobile support as a continuous sheet and collected in rolls for further processing and conversion into discrete forms for the intended use. As with conventional paper products the film/sheet is characterized by high wet strength, low dispersibility and desirably smooth surfaces on both sides. Again, these products have low organoleptic acceptance.

In contrast to paper related products, numerous film products based on natural polymers such as proteins, gums and starches are organoleptically well tolerated. Additionally, synthetic, water soluble polymers, such as those based on maleic anhydride, polyvinylpyrrolidone and cellulose ethers are also well accepted. However, films derived from water soluble polymers or hydrocolloids suffer from the very property that makes them organoleptically acceptable and easy to make, i.e. they readily disintegrate in the presence of water. With the exception of dried cereal products and powdered mixes, most food products contain substantial water.

Consequently, an edible film possessing the beneficial particulate structural characteristics of paper, yet displaying the organoleptic quality of water soluble polymer films would be useful in applications for improving processed food products. Such films could serve as lipophilic or hydrophilic barriers within a compartmentalized food construct, as edible wraps or packaging materials, as a texturizing and laminating agent or structural enhancement component. The application opportunities for such films are numerous and diverse. Yet in spite of need and opportunity, such films have not become commercially available. The physical constraints on the products produced by continuous cast film technology which are based on belt systems have limited the application of the resulting products in food systems.

Drum driers have been used as a means of continuous drying of high solids, viscous products. Water or the continuous solvent phase is removed by evaporative means through heat transferred to the external surface of the drum from steam delivered to the internal cavity of the drum. In contrast to dispersed droplet drying such as spray drying, very high viscosity materials can be processed efficiently. In usual practice the dried product is removed from the drum by a scraper assembly or doctor knife in the form of brittle flakes. Films are not desired as their release is generally a problem and uneven build up on the drum leads to poor control of heat transfer and ultimately unstable drying. Furthermore, all products dried on drum driers are destined to ultimately be recovered in powdered form and a substantially sheetlike released product is difficult to collect and grind. Hence drum driers have historically been used to produce products which are not discharged as flexible film sheets.

SUMMARY OF THE INVENTION

It has now been found that certain compositions based on cellulosic matter can be continuously cast, dried and released inact, as a continuous, coherent film sheet.

According to one aspect, the present invention provides a process for continuous casting of film sheets, comprising passing a film-forming fluid through the nip of a pair of side-by-side heated rollers, so as to convert the fluid to a film having opposite coherent surfaces respectively engaging opposite rollers of the pair. The film becomes divided between the opposite surfaces into two distinct, self-supporting, continuous film sheets after exiting the nip of the rollers. Each sheet has one side comprising one of the opposite coherent surfaces and adhering to a surface of one of the rollers, and a second side which is opposite the side adhering to the roller surface. The second side has microscopic protuberances extending from the surface thereof, in contrast to the side facing the roller surface which is relatively smooth. The rollers are heated sufficiently to dry the resulting continuous film sheets, which release intact from the surface of each roller.

The film sheets thus produced possess sufficient flexibility to form rolls, but have organoleptic quality distinct from existing paper products. The resulting rolled stock is suitable for subsequent processing on specialized converting equipment for production of discrete sheeted forms which can be used to advantage in various comestibles.

An unexpected feature of the process of this invention is that the film sheets produced thereby possess anisotropic morphologies on the opposite surfaces, as noted above. More specifically, the side of the film sheet contiguous with the drum surface is generally smooth, while the opposite side is highly irregular, with dendritic projections, the dimensions of which approach 25 to 50% of the apparent film thickness. This latter characteristic has important adherent properties in comestible applications.

BRIEF DESCRIPTION OF THE DRAWING

The sole drawing FIGURE is a schematic illustration of the production of edible film using a pair of heated rollers, in accordance with the present invention.

DETAILED DESCRIPTION OF THE INVENTION

Figure 1:
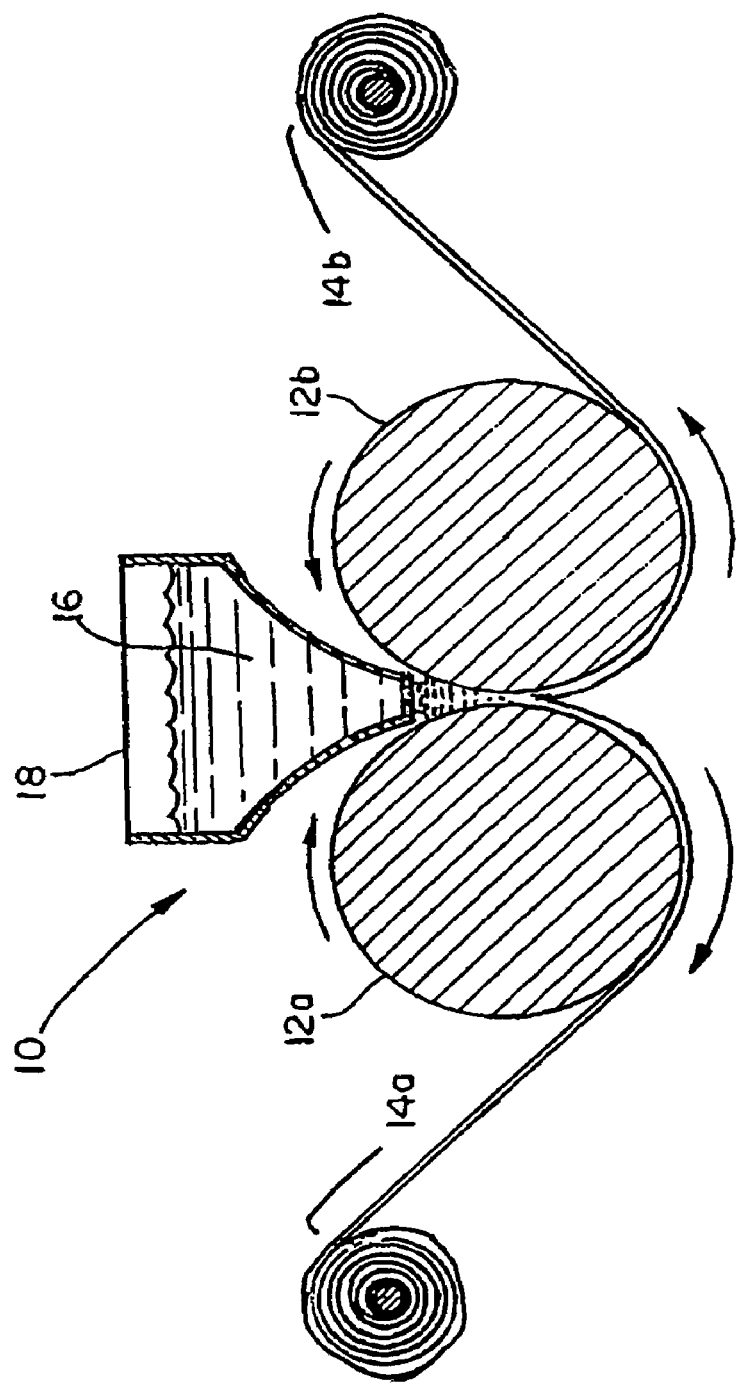

The prior art related to this invention is largely found in U.S. Pat. No. 5,487,419 which describes a process for preparing dried, rehydratable forms of a mechanically disintegrated cellulose. In this patent two thin film drying methods individually combined with encasement and/or stabilizer additives were described to produce rehydratible products in flake and powder form. Of special interest to the practice of the invention of U.S. Pat. No. 5,487,419 is the double drum drier. While continuous thin film drying, by the nature of the process, produces a contiguous film on the revolving surfaces, such films are difficult to remove as a contiguous sheet, unless they possess paper-like qualities such as a high tear modulus. Such properties are not compatible with the intended applications of the present invention.

In a typical drum drier application, mechanical intervention in the form of a stationary doctor blade applied to the rotating surface is required for release or removal of the dried product. The dried product preferably possesses brittle, inelastic character which readily flakes from the drying surface. Flexible and elastic films represent a class of dried products which are not indicated for drum driers as they generate delicate, adhering films requiring constant manual scraping to maintain a clean drying surface. This situation produces discontinuous sheet-like segments, as the product must be manually stripped from the drying surface producing a material form that is difficult to handle and grind.

The method of the present invention, by contrast, enables the production of edible cellulosic films which are released intact from the surface of the drum drier. As can be seen in the accompanying drawing, the process of the present invention is conveniently carried out using a system 10 comprising a pair of side-by-side heated rollers, 12a, 12b, as in a conventional double drum drier. An aqueous dispersion 16 of a suitable film-forming fluid, preferably comprising a food grade cellulosic material, is introduced into reservoir 18, from which it is dispensed for introduction into the nip of rollers 12a, 12b. As the fluid traverses the nip of rollers 12a, 12b, heat applied at the roller surfaces causes evaporation of the aqueous phase, thus producing a hardenable film having opposite coherent surfaces respectively engaging the opposing roller surfaces. As the film thus produced proceeds through the zone of divergence defined by the rotating roller surfaces at the exit side of the nip, it is divided between the opposing roller surfaces into two distinct, self-supporting, continuous film sheets, each sheet having one side, which comprises one of the opposite coherent surfaces of the originally formed film, that adheres to the surface of one of the rollers, and a second side which is opposite the side adhering to the roller surface. The second side has microscopic protuberances extending from the surface thereof, as previously noted, whereas the one side is relatively smooth. The resulting sheets release intact from their respective roller surfaces and are easily wound onto winder assembly reels 14a and 14b as rolled stock.

The expression "releasing intact", as used herein in reference to the film produced by the method of the invention, is intended to signify that the film is free of damage of the sort which would render it unfit for its intended use. Insofar as is known, continuous, coherent cast films producing a homogeneous roll by means of a drum drier do not exist in the art. Furthermore, a method of producing cast films with substantially anisotropic morphologies on opposite surfaces is not believed to be known in the art.

The film-forming fluid is preferably a dispersion of structurally expanded cellulose in a continuous liquid phase and may optionally include a variety of additives, such as are typically included in comestibles. These additives include, without limitation, plasticizers, release agents, tensile strength promoting agents and rehydration agents.

Among the plasticizers suitable for use in this invention are glycerol, propylene glycol, erythritol, maltitol, sorbitol and polyethylene oxides which are used in amounts sufficient to impart flexibility to the resulting film sheet.

Representative examples of useful release agents are alkali metal salts of medium and long chain saturated fatty acids.

Tensile strength promoting agents which may be used in practicing the invention include water soluble oligosaccharides and polysaccharides, water soluble proteins and water soluble cellulose ethers. The same classes of additives may be employed as rehydration agents, if desired.

The resulting film sheet can be formed into various shapes, e.g. by die-cutting or the like, depending on the intended use. The film sheets may also be perforated, if desired. See, for example U.S. Pat. No. 5,716,658 to Donnelly et al., the entire disclosure of which is incorporated by reference herein.

The film sheets of the invention can be beneficially incorporated into a variety of comestible substances, and in particular, frozen or parbaked dough pieces, to which the film sheets are readily laminated. For example, the film sheets of the invention are useful as an edible baking substrate for frozen pizza products, as they have sufficient structural stability to resist the deformation of the pizza dough over the rods of an oven rack, which can result in uneven baking.

The film sheets of the invention are also useful for providing a barrier between components of heterogeneous comestible substances, e.g. to prevent migration of water from one component to another. The film sheets described herein can also be interleaved with sliced cheese foods for ease of separating one slice from the next.

Composite film sheets can also be produced in accordance with this invention, in which another material, such as a lipid, may be uniformly dispersed throughout the sheet or provided as a distinct coating layer thereon. Suitable lipids for this purpose are monoglycerides, diglycerides and triglycerides of unsaturated and saturated fatty acids having at least five carbons; lecithin; and various waxes including those of insect, animal, vegetable of mineral origin, as well as synthetic waxes such as polyethylene wax.

The following example section is provided to describe the present invention in further detail. This example section is intended merely to illustrate a specific embodiment of the process of the invention and should in no way be construed as limiting the invention.

EXAMPLE 1

A cellulosic gel containing 4.9% w/w refined cellulose derived from wheat straw was produced according to the method described in U.S. Pat. No. 5,487,419, the entire disclosure of which is incorporated by reference herein. The formula for the gel is found in Table 1.

TABLE 1

| Wheat Straw Cellulose | 590 lb. |
|---|---|
| Glycerin | 90 lb. |
| Propylene Glycol | 60 lb. |
| CMC High Viscosity | 80 lb. |
| CMC Low Viscosity | 80 lb. |
| Sorbic Acid | 2 lb. |
| Water | 11190 lb. |

The sodium carboxymethylcellulose (CMC) products employed were obtained from Diachi Chemical Company, Ltd., Japan and are identified as type HP 5HS (high viscosity) and type HP 8A (low viscosity). The company specifications and Code of Federal Regulations (CFR-21) regarding food grade CMC are incorporated by reference. Wheat straw cellulose is a proprietary product manufactured by Watson Foods Company, Incorporated, Connecticut and is a chemically delignified, bleached form of alpha cellulose. Glycerin, propylene glycol and sorbic acid are food grade ingredients complying with chemical and regulatory standards of identity for food use.

The cellulosic gel was refined over a period of 5 hours to a limiting viscosity of 2000 cps as measured on a 2% w/w aqueous homogenate prepared from the refiner paste with a Brookfield RTV viscometer at 20° C. using a #5 spindle at 50 RPM.

A reconditioned, chrome-plated double drum drier originally manufactured by the American Drum Drier Company, Michigan with drum dimensions of 11 foot length and 42 inch diameter was employed. The internal drum temperature was 280° F. supplied by 35 psi steam. The gap between the drums was maintained at 0.030 inch. The drum rotation speed was set at 1.2 rpm. The flow to the nip reservoir was maintained at approximately 2.5 gpm to achieve a steady state level. The resulting film spontaneously released and was collected by means of a winder assembly for each drum that was controlled by an electronic tension sensor which regulated the winder motor.

The film was collected onto a 4 inch diameter core in ten foot long rolls to a width of 24 inches. The apparent moisture content as measured by weight lost at 104° C. for 16 hours was 8.0%. Surprisingly the film while relatively fragile was robust enough to be consistently formed into rolls without tears or rips. To evaluate the degree of irregularity on the distal film surface from the drum, a method was devised to literally shave and calender the microscopic protuberances from the base film. A section of the film was laid flat on a hard, smooth surface. A fresh safety razor blade was positioned perpendicular to the surface and manually drawn across the irregular film surface in a lateral stroke transverse to the plane of the blade several times until it moved smoothly without resistance. The film thickness was then measured with a micrometer in the shaved area and contiguous unshaved areas. Several measurements were averaged. The technique required some practice but once mastered was highly reproducible. The thickness of the above film base was 0.00293 inches and the apparent thickness of the unshaven film was 0.00660 inches +\- 0.00099 inches yielding an approximate dendritic depth to the irregular film surface of 50%. It is believed that the irregular surface is important in providing adherence to semi-soft food matrices and could serve as a bilayer containing lipid or lipid-like substances in structured comestibles with laminated features.

While certain embodiments of the present invention have been described and/or exemplified above, various other embodiments will be apparent to those skilled in the art from the foregoing disclosure. The present invention is, therefore, not limited to the particular embodiments described and exemplified, but is capable of considerable variation and modification without departing from the scope or the appended claims.

What is claimed is:

1. A process for continuous casting of film sheets, comprising passing a film-forming fluid through the nip of a pair of side-by-side heated rollers, said film-forming fluid being a dispersion comprising structurally expanded cellulose dispersed in a continuous aqueous phase including at least one plasticizer, in an amount sufficient to impart flexibility to said film sheets, said fluid being converted to a plasticized film having opposite coherent surfaces respectively engaging opposite rollers of said pair, said film becoming divided between said opposite surfaces into two distinct, self-supporting, continuous film sheets after exiting the nip of said rollers, each sheet having one side comprising one of said opposite coherent surfaces adhering to a surface of one of said rollers, and a second side which is opposite the side adhering to the roller surface, and which has microscopic protuberences extending from the surface thereof, the one side of each sheet facing said roller surface being relatively smooth, said rollers being heated sufficiently to dry the resulting continuous film sheets, said resulting sheet releasing intact from the surface of each roller.

2. The process of claim 1, further comprising winding said dry continuous film sheets after release from said rollers into rolled stock.

3. The process of claim 1, wherein said dispersion further comprises at least one additive selected from the group of release agents, tensile strength promoting agents and rehydration agents.

4. The process of claim 1, wherein said at least one plasticizer is selected from the group of glycerol, propylene glycol, erythritol, maltitol, sorbitol and polyethylene oxides.

5. The process of claim 3, wherein said dispersion comprises at least one release agent selected from the group of alkali metal salts of medium and long chain saturated fatty acids.

6. The process of claim 3, wherein said dispersion comprises at least one tensile strength promoting agent selected from the group of water soluble oligosaccharides and polysaccharides, water soluble proteins and water soluble cellulose ethers.

7. The process of claim 3, wherein said dispersion comprises at least one rehydration agent selected from the group of water soluble oligosaccharides and polysaccharides, water soluble proteins and water soluble cellulose ethers.

8. The process of claim 1, wherein said film sheets are formed by passing said film-forming fluid through the nip of a chrome-plated double drum dryer.

* * * * *